United States Patent [19]

Raj et al.

[11] 4,252,328
[45] Feb. 24, 1981

[54] SELF-ACTIVATING FERROFLUID SEAL AND METHOD

[75] Inventors: Kuldip Raj; Ronald Moskowitz, both of Merrimack; Raoul Casciari, Bedford, all of N.H.; Alvan F. Chorney, Stoughton, Mass.

[73] Assignee: Ferrofluidics Corporation, Nashua, N.H.

[21] Appl. No.: 145,828

[22] Filed: May 1, 1980

Related U.S. Application Data

[63] Continuation-in-part of Ser. No. 33,466, Apr. 26, 1979.

[51] Int. Cl.$^3$ .................. F16J 15/16; F16J 15/40
[52] U.S. Cl. ............................. 277/1; 277/34.3; 277/80; 277/226; 206/303; 156/86; 156/122
[58] Field of Search ............ 206/303; 277/34, 34.3, 277/34.6, 80, 226, DIG. 7; 308/187.1, 187.2; 156/86, 122

[56] References Cited

U.S. PATENT DOCUMENTS

| | | | |
|---|---|---|---|
| 1,311,392 | 7/1919 | Harrison | 156/122 |
| 2,309,658 | 2/1943 | Miller | 277/34.3 |
| 2,893,060 | 7/1959 | Wills | 277/226 X |
| 3,038,732 | 6/1962 | Scott et al. | 277/34 |
| 3,322,430 | 5/1967 | Voitik | 277/84 X |
| 3,740,060 | 6/1973 | Miskolczy et al. | 277/80 |
| 3,847,694 | 11/1974 | Stewing | 156/86 |
| 4,171,818 | 10/1979 | Moskowitz et al. | 277/80 |
| 4,194,746 | 3/1980 | Stevens | 277/34.3 |

FOREIGN PATENT DOCUMENTS

| | | | |
|---|---|---|---|
| 241706 | 11/1962 | Australia | 277/226 |
| 678981 | 9/1952 | United Kingdom | 277/80 |
| 2006890 | 5/1979 | United Kingdom | 277/34.3 |
| 420836 | 8/1974 | U.S.S.R. | 277/80 |

*Primary Examiner*—Robert S. Ward, Jr.
*Attorney, Agent, or Firm*—Richard P. Crowley

[57] ABSTRACT

A self-activating ferrofluid-seal apparatus for a memory-disc-drive shaft, which seal apparatus comprises a ring magnet and a pair of pole pieces which form a cavity therebetween, a closed loop of a plastic tubular container with ferrofluid positioned within the cavity, and a penetration clamp to penetrate the plastic container prior to installation of the shaft element.

30 Claims, 6 Drawing Figures

SELF-ACTIVATING FERROFLUID SEAL AND METHOD

This application is a continuation-in-part application of U.S. Ser. No. 033,466, filed Apr. 26, 1979, which application is incorporated by reference in its entirety.

BACKGROUND OF THE INVENTION

Magnetic-fluid seals have been used to provide a positive hermetic barrier against gas and other contaminants. For example, a multiple-stage magnetic-fluid-seal apparatus is disclosed in U.S. Pat. No. 3,620,584, hereby incorporated by reference. A magnetic fluid, known as ferrofluid, used in such seals is described, for example, in U.S. Pat. No. 3,917,538, also hereby incorporated by reference. Typical magnetic-fluid exclusion seals operate through the employment of ferrofluid in a gap between rotary and stationary surfaces in the presence of a magnet, which provide focused radial magnetic-flux lines which retain the ferrofluid in a liquid O-ring in the gap about a shaft surface.

Ferrofluid-exclusion seals have been employed in computer magnetic-disc storage units and prevent contaminants from reaching the magnetic-disc area. Ferrofluid-exclusion-seal modules encased in a nonmagnetic housing have been used with computer-disc drives, to prevent the ingression of airborne or other particulates and vapors up and around the disc-drive shaft. The exclusion-seal module comprises a permanent ring magnet polarized axially, and generally a pair of magnetically permeable pole elements which sandwich the magnet, so that the inner peripheral ends of the pole pieces extend toward and form a close, noncontacting gap with the exterior shaft surface of the computer-disc drive.

In the past, ferrofluid was painted or otherwise applied in the gaps, to form a sealing liquid O-ring which was retained in position through the complete magnetic-flux circuit with the magnetically permeable disc-drive shaft. The exclusion-seal module is magnetically isolated from the disc memory, to prevent the low-strength magnetic field of the module from interfering with the information stored on the memory disc. While such ferrofluid-exclusion seals have been employed successfully, it has been found that the application of the ferrofluid, to form the liquid O-ring seal, requires a certain amount of skill, and, in addition, it has been difficult to determine when the correct amount of ferrofluid has been applied.

REFERENCE TO PRIOR APPLICATION

The parent application discloses an improved, self-activating, ferrofluid seal apparatus and method, wherein a defined sealing volume of ferrofluid is retained in a stored position within a cavity and then physically transported through alteration of the magnetic-flux path from the stored position to an O-ring sealing position at the end of the pole pieces, to form a sealing relationship with a rotating shaft element, particularly of a computer-disc drive. The transportation of the ferrofluid from the stored to the sealing positions occurs by the insertion of the magnetically permeable rotating shaft member within the ferrofluid self-activating seal apparatus.

In one embodiment, the self-activating ferrofluid seal apparatus comprises a nonmagnetic storage means in the form of an annular aluminum storage ring bridging the gap between the pole pieces, which seals the ferrofluid within the cavity formed by the permanent magnet and the sandwiched pole pieces. The storage ring prevents premature dislodgement of the ferrofluid from the cavity during shipment or storage. Plug means are provided in the storage ring to be removed at the point of installation and prior to the insertion of the magnetically permeable shaft member, so as to permit the ferrofluid, retained and stored within the cavity, to be moved from the stored to the sealing positions.

SUMMARY OF THE INVENTION

This invention relates to an improved, self-activating, ferrofluid seal apparatus, the method of fabricating such apparatus and the method of using the apparatus to obtain a hermetic seal. In particular, this invention concerns an improved self-activating seal apparatus and the method of manufacture and use, wherein a sealing amount of a ferrofluid is contained within a separate tubular container in the cavity, and means are provided to puncture the container and release the ferrofluid, prior to installation of the self-activating seal.

This invention is directed to an improvement of the self-activating seal as described in the parent application. It has been found that the self-activating seal of the parent application, while useful and effective, sometimes presents difficulties in connection with the ferrofluid within the cavity. In order to avoid the absorption of the ferrofluid within the porous permanent-magnet material employed and to prevent the possibility of leakage of the ferrofluid between the pole pieces and the permanent magnet, it is often necessary to provide a coating on the permanent magnet or to provide adhesive or coating or other means to provide a fluid-tight seal between the pole pieces and the magnet. While such coating and sealing may be accomplished easily, it does add an additional manufacturing step and adds to the cost of the self-activating seal. Therefore, it has been discovered that a self-activating seal, containing a separate generally tubular or ring-like container within the cavity, together with means to provide for the penetration of the container prior to use, represents a substantial improvement in the storage and transportation of the stored ferrofluid and also in the application of the ferrofluid.

In the improved self-activating seal apparatus of this invention, a small, but sealing, amount of a ferrofluid, such as a diester-based or other liquid lubricant-based ferrofluid, is disposed or otherwise contained within a generally tubular or ring-like container, with the ring-like container positioned within the peripheral cavity formed between the permanent magnet and the pole pieces. Penetrating means are also provided, so as to permit the penetration of the ring-like container prior to installation, either by the manufacturer prior to shipment or by the customer prior to installation of the self-activating seal. The penetrating and unsealing of the separate ring-like container by the penetrating means permit the ferrofluid to move from the separate container within the cavity and from the stored position to the gaps between the ends of the respective pole pieces and the rotatable shaft, in order to occupy a sealing position.

The improved self-activating seal apparatus is adapted for use with and to seal a magnetically permeable, movable, shaft element, such as the rotary shaft element of a computer-disc drive. The seal apparatus comprises an axially polarized permanent-magnet ring element, which is generally disposed to be aligned axially about the shaft element, the magnetic ring element disposed in a nonmagnetic housing. The seal apparatus also comprises at least first and second magnetically permeable pole pieces, each pole piece at the one end disposed in a magnetic-flux relationship and a fluid-sealing relationship, if desired, with one pole of the permanent-magnet ring element. The other end of the first and second pole pieces are generally positioned to extend into a close, noncontacting relationship with the surface of the rotating shaft element and to form a small gap; for example, 2 to 10 mils, with the surface of the rotating shaft element, upon insertion of the shaft element within the seal apparatus.

The first and second pole pieces and the magnetic ring element form a generally annular storage cavity therebetween, through which storage cavity the magnetic flux of the ring element is concentrated in the absence of the shaft element being inserted within the seal apparatus; that is, the magnetic flux is typically concentrated at the intersection of the pole pieces at the one end and the magnetic ring element. Within the storage container is positioned a separate ferrofluid storage-container means, typically a tubular or ring-like separate container means, preferably in a closed circular loop; for example, preformed and occupying a major portion of the volume of the cavity. The tubular or ring-like storage-container means contains an effective, but sealing, amount of the ferrofluid which is to be employed in the sealing relationship when the seal is activated.

The self-activating seal also may include therewith means to penetrate and to reseal the tubular or ring-like container of the ferrofluid, to permit the ferrofluid therein to move from within the penetrated, unsealed container means to the O-ring sealing position, upon the insertion of the shaft element. The means to penetrate, or otherwise to puncture or unseal the separate tubular container within the cavity, may be activated by the manufacturer prior to shipment of the self-activating seal, provided that means also are employed to seal the penetrated cavity prior to use, or, if desired, the customer may use the penetrating means or other means to penetrate the tubular or ring-like container just prior to installation, so that the plugging or sealing of the penetrated container during transportation need not be of concern.

The self-activating seals of this invention are particularly useful in sealing computer-memory-disc areas from contaminants originating from inside or outside the spindle. Typically, the magnetic disc-drive computer whirls at speeds of up to 6,000 rpms and is separated from the read/write head by a very small clearance, for example, of 0.000100 to 0.000050 of an inch, so that even the smallest particle can result in a collision between the head and the disc; thus causing a possible loss of information and/or possible damage to the components. The self-activating seal is usually assembled between the driving means and the magnetic memory disc, and in particular between the top bearing and the disc, and activated by the insertion of the disc-drive shaft within the self-activating seal. Once activated, the permanent magnet and the pole pieces remain stationary, with the gap between the other ends of the pole pieces and the exterior surface of the rotating shaft filled with a ferrofluid seal, to create a sterile environment in which the disc and head may operate without danger of contamination.

As in the parent application, the self-activating-seal module generates a characteristic magnetic-flux path which runs from one pole of the permanent magnet through the adjacent pole piece and typically across the cavity through the other pole piece and returns to the other pole of the permanent magnet. While in theory numerous magnetic-flux paths may exist in the space surrounding the permanent magnet, in practice a nearly exclusive magnetic-flux path is the path of least reluctance; that is, the path through the cavity. Ferrofluid unconfined within the cavity will be attracted to the corners of the cavity closest to the intersection of the pole pieces and the permanent magnet. However, when another magnetically permeate member, such as a shaft member, is inserted within the self-activating-seal module, the path of least reluctance is altered, such that a nearly closed magnetic-flux circuit or flow path is formed by the pole pieces and the inserted shaft element. Ferrofluid is drawn, in the improved self-activating seal, from the penetrated separate container means within the cavity to a sealing position, to seal the gaps between the surface of the rotating shaft element and the other ends of the pole pieces.

The improved self-activating seal of the invention does not require the coating or sealing of the permanent magnet, nor the sealing of the cavity, since the sealing amount of ferrofluid is contained within a separate container disposed within the cavity. In one embodiment, the container comprises one, two or more closed, circular, sealed-tube loops containing a sealing amount of ferrofluid. The tubes may be flexible or preferably rigid or semirigid in nature and form, and typically may be made of plastic or some other nonmagnetic material. The sealed tubes preferably occupy a majority and substantially all of the cavity. The sealed tubes may be formed of any material, but preferably are formed of plastic material, such as a thermoplastic like a polyethylene or polypropylene material, and particularly preferred is a heat-shrinkable plastic material. The material of the tubes should be compatible with the ferrofluid composition to be employed and be capable of storing and containing therein the ferrofluid composition.

The tube containers of the ferrofluid may have a length which is all or substantially all of the periphery of the cavity, so that the tubes may be positioned within the cavity and shipped for use with the seal module or shipped separately for use with the seal. The tube containers may be flexible; however, it has been found that flexible tubes, while satisfactory, are often difficult to handle and to insert rapidly into the cavity, and, therefore, rigid or semirigid tube containers are preferred, with the tube containers formed in the generally ring-like, closed, loop form about the diameter of the cavity, so that one or more of the tube containers may be positioned easily in the cavity and not extend beyond the other end of the pole pieces. The containers are filled with the desired amount of ferrofluid and the ends thereof sealed and the tubes positioned and disposed within the cavity, or tube containers may be formed into a ring form of the desired diameter and filled, before forming into a ring, with ferrofluid, and then one or more rings inserted into the cavity.

In one embodiment, a closed, loop, tube container is formed from a heat-shrinkable plastic tubing, such as of an oriented plastic like polypropylene. A defined length (slightly in excess of the perimeter) of the heat-shrinkable plastic tubing compatible with the ferrofluid is filled with ferrofluid, and, thereafter, one end of the cut linear length is heat-shrunk to seal the one end of the tube. The heat-shrinking substantially reduces the diameter of the sealed heat-shrunk end of the tube. The heat-shrunk end of the tube is then inserted into the open, larger-diameter, nonheat-shrunk, opposite end of the tube, and, thereafter, exposed to heat to effect an overlapping heat-shrunk seal, so that the tube container is then formed in a sealed ring of desired dimension and containing the ferrofluid. Preferably the tube container is formed of a material which may be penetrated or punctured easily by the penetrating means, and also a material which, after penetration, may be sealed easily, as hereinafter described.

A penetrating or other puncturing device or means is provided with or separately from the seal, so that the manufacturer of the self-activating seal, or the customer prior to installation, may penetrate the tube container, typically with at least two holes, one acting as a vent and the other acting to permit the flow of ferrofluid to the sealing position, on insertion of the shaft element. One penetrating means of the invention comprises a removable clamp-type means containing, within the interior of the clamp means, a plurality of penetrating prongs, and which clamp means is disposed for a snug-fitting, slidable relationship against the exterior surfaces of the respective pole pieces. The clamp means may, upon radially outward movement, cause the penetrating prongs to penetrate the tube container within the cavity. The penetrating means is removed by the customer prior to insertion of the shaft element for disposal or reuse.

The clamp-like penetrating means may be activated either by the manufacturer or by the customer or user. The manufacturer may actuate the penetrating means prior to shipment of the self-activating seal to the user, in which case the clamp-like means may be pushed radially outwardly, so that the prongs penetrate the plastic container and the prongs remain in place, so as to form a sealing plug, and the seal is shipped with the tubes penetrated, but sealed. Thereafter, the customer, just prior to insertion of the shaft, merely may remove the penetrating clamp to unseal the penetrated tube container. In this arrangement, the manufacturer assures the correct and proper penetration of the tube container of ferrofluid, and yet provides for a seal of the penetrated container until use. However, in some situations, it may be desirable to permit the customer or others to activate and penetrate the tube container just prior to use, so that the customer then would penetrate the tube container with the clamp by outward movement and then remove the clamp and insert the shaft within the self-activating-seal module. In either case, the improved self-activating seal provides for a separate penetrating means in connection with the improved self-activating seal of this invention.

In operation, the ferrofluid is stored within the tube-container means, the tube containers are inserted within the cavity at the point of manufacture, and, once inserted, in one embodiment, a penetrating means, such as a clamp, also is secured to the seal module. One clamp means is designed to be placed in the inner annular space of the module in such a way that it wraps around the peripheral pole pieces, and includes two or more prongs which extend radially outwardly into the module cavity and are adapted to pierce the ferrofluid-filled tubes. The tubes are pierced by the manufacturer and the pierced tubes remain plugged by the prongs, with the self-activating seal shipped or stored in this condition. On receipt, the customer or user simply removes the clamp before installation and insertion of the shaft element. The ferrofluid within the pierced tube container will then migrate at a rate depending on the size, number and location of the holes in the pierced tube containers, and the ferrofluid, as the shaft or seal is moved about the shaft, then forms an O-ring liquid seal.

This invention will be described for the purpose of illustration only in connection with a preferred embodiment; however, it is recognized that various changes and modifications may be made to the illustrated embodiment by those persons skilled in the art, all of which changes and modifications are within the spirit and scope of the invention.

BRIEF DESCRIPTION OF THE DRAWINGS

FIG. 1b is an illustrative, perspective view of the penetrating clamp employed with the self-activating seal of FIG. 1a;

DESCRIPTION OF THE EMBODIMENTS

Figure 1A:
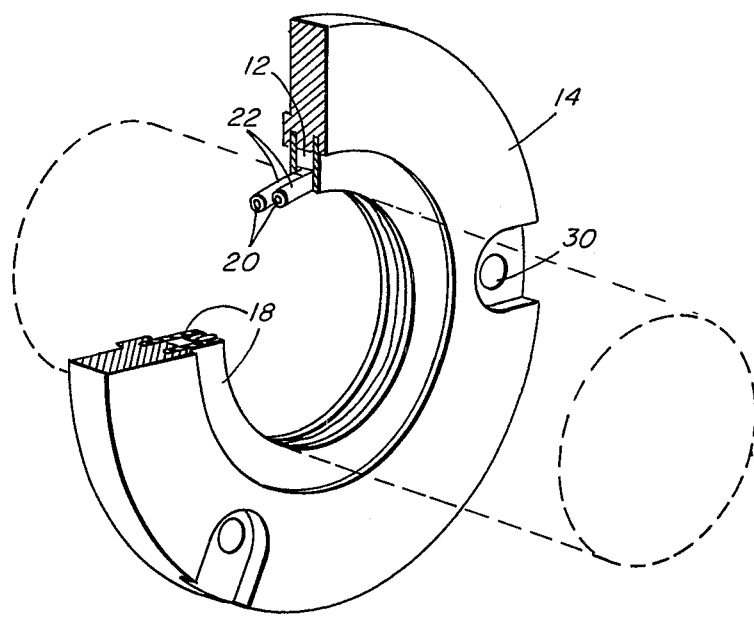
FIG. 1a is an illustrative, perspective, cross-sectional view of the self-activating seal of the invention.

FIG. 1a shows a magnetic self-activating seal 10 comprising a ring permanent magnet 12, with axially affixed pole pieces 18 secured to each end of the ring magnet and in a magnetic-flux relationship therewith, the ring magnet 12 and pole pieces 18 within a nonmagnetic flanged housing 14. The ring magnet 12, together with the pole pieces 18, form a cavity therebetween, in which cavity are disposed two tubular, ring-like, closed-loop, plastic containers 22, each of which contains therein a ferrofluid 20. As illustrated, the tubes 22 are preformed in a closed ring-like configuration, with the ends thereof sealed, the tubes occupying a substantial portion of the cavity and filled with a diester-type ferrofluid; for example, rated at 450 gauss and 750 centipoises.

The tubular containers 22 comprise a polyethylene or polypropylene tube having a diameter of approximately 1.85 inches and having a heat-shrunk diameter of approximately 60 mils and having a general wall thickness, for example, of 1 to 10 mils. The housing module 14 is composed of a nonmagnetic material, such as aluminum, while the shaft element 16 (shown in dotted lines) is composed of a magnetically permeable material, such as steel. The housing 14 of the self-activating seal is mounted through the use of bolt holes 30, to provide a stationary support for the seal module, while the shaft 16 is driven by a computer-disc motor drive or other means (not shown). The pole pieces 18 are arranged, so that a small clearance exists of 4 to 10 mils between the ends of the pole pieces and the surface of the shaft, with the pole pieces typically constructed of a magnetically permeable material, such as steel. The ring magnet 12 may be composed of a number of different permanent magnetic materials ranging from low-energy ceramics to high-energy Alnico series alloys. For example, a seal module 10 may comprise an internal diameter of 1.200 inches and be disposed to be used with a shaft 16 of about 1.180 inches, with the cavity formed by the ring magnet 12 and the pole pieces 18 about 120 mils in width and height, with two containers 22 having a heat-shrunk diameter of about 60 mils positioned in the cavity and containing about 150 to 200 microliters of ferrofluid.

Figure 5:
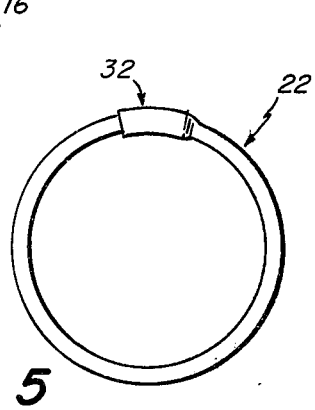
FIG. 5 is an illustrative, perspective view of the closed-loop containers of ferrofluid used in the seal.

The tubular containers 22 shown in FIG. 5 are formed through the use of a heat-shrinkable plastic tubing having a diameter of approximately 120 mils prior to heating, and wherein a defined length of the tubing is cut off and ferrofluid is injected into the interior, with one end sealed by heat-shrinking and then the heat-shrunk end inserted into the other end, to form a ring-like tubular container 22, with the other end sealingly heat-shrunk around the previous heat-shrunk end to form an overtop seal 32. Thereafter, the tubular container 22 is inserted within the cavity. The containers should contain a sufficient amount of ferrofluid to form the desired liquid-sealing O-ring about the surface of the shaft and the ends of each of the pole pieces.

Figure 1B:
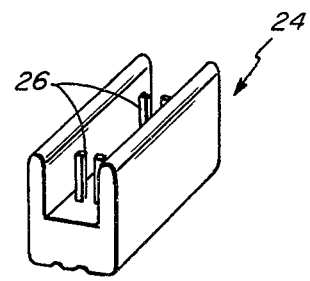

FIG. 1b shows a penetrating U-shaped clamp 24 composed of a non-magnetic plastic material, which contains in the interior of the clamp four inwardly directed prongs 26. The prongs are aligned with and separate from each other and are so disposed so that the prongs may puncture simultaneously each of the two tubular containers 22 within the cavity, so as to form a vent and flow hole within each tubular container. The distance between the two sides of the U-shaped clamp is slightly less than the diameter between the outer edges of the pole pieces 18, so that the clamp 24 may be removably mounted and secured across the pole pieces, with the penetrating prongs 26 extending radially outwardly and the clamp adapted for slidable movement around the surface of the pole pieces, where multiple penetration by the user is desired. The clamp 24 is composed of an elastomeric material, while the prongs may be a sharp metal material. The depth of the sides of the clamp 24 should be sufficient to permit penetration of both of the tubes in the cavity, upon radially outward movement of the clamp 24, when disposed in the position on either side of the pole pieces.

Figure 2:
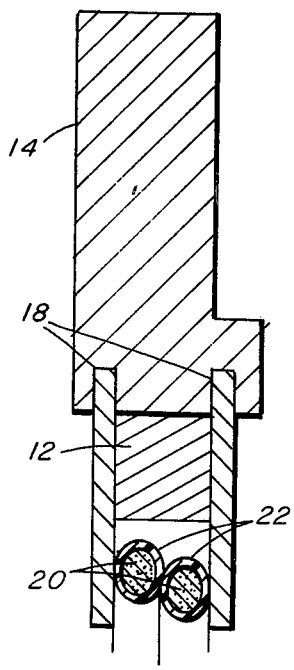
FIG. 2 is a partial, enlarged, cross-sectional view of the self-activating seal, with the tube container in position within the cavity.

FIG. 2 shows a cross-sectional view of the tubular containers 22 positioned within the cavity without the clamp 24 in position.

Figure 3:
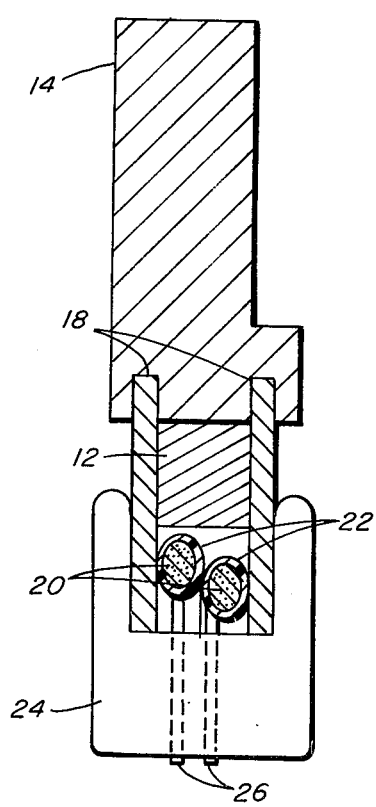
FIG. 3 is a partial, enlarged, cross-sectional view of the self-activating seal, with the penetrating clamp in the penetrated sealed position.

FIG. 3 shows the penetrating clamp 24 in position, with the prongs 26 shown as penetrating and sealing the penetrated tubular containers 22. The holes 28 are sealed by the prongs 26. The seal 10, with the clamp 24 secured in this position, such as by adhesive tape or other means, if desired, is then shipped to the user. Of course, the clamp 24 may be shipped and used separately by the customer or other penetrating means used by the customer to penetrate the containers 22 prior to use. Thus, the seal 10 may be sold and shipped without any penetrating means.

Figure 4:
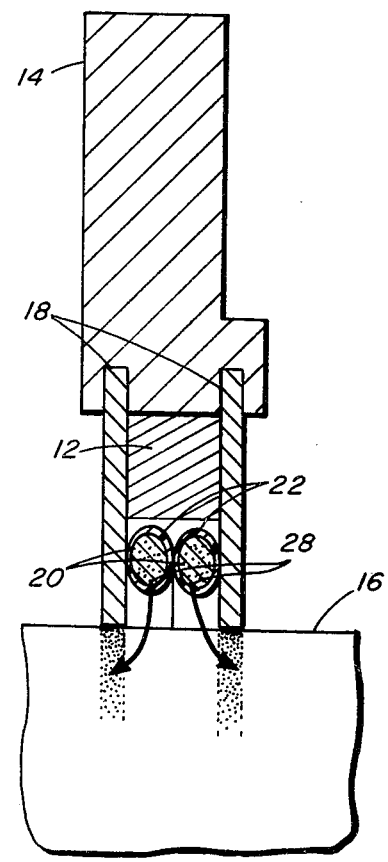
FIG. 4 is a partial, enlarged, cross-sectional view of the self-activating seal after penetrating and unsealing of the tube container and with the shaft inserted within the self-activating seal.

FIG. 4 shows the seal 10 with the shaft 16 inserted and the ferrofluid 20 forming an O-ring seal on the shaft surface, with the movement of the ferrofluid from within the penetrated containers 22 through holes 28, to form the O-rings illustrated by the flow arrows.

FIG. 5 shows the closed-loop tubular containers 22 with the overlap heat-shrunk ends 32 prior to insertion in the cavity.

In operation, the self-activating seal is manufactured as a ready-to-use self-activating-seal unit. On assembly of the seal, the tubes 22 are filled with ferrofluid 20 and are affixed within the cavity between the pole pieces 18. The clamp 24 is then attached to the pole pieces in the manner shown in FIG. 3, and the prongs of the clamp penetrate the tubular containers 22. The clamp 24 is left in position, so that the prongs form a seal for the holes 28 made in the tubular containers 22. The self-activating seal is then shipped to the user in this condition. At the point of use, the clamp 24 is removed by the user, and the housing 14 is placed on the shaft 16 and secured in stationary position through bolt holes 30. Once the seal module is in place about the shaft 16, the magnetic-flux distribution path is altered, and, with the removal of clamp 24, the ferrofluid is released through holes 28 to fill the gaps between the pole pieces 18 and the shaft 16 to form a liquid O-ring seal.

The self-activating seal, as described and illustrated, provides for a very low-cost, ready-to-use, self-activating seal, particularly useful with computer-disc drives, and overcomes many of the disadvantages associated with prior ferrofluid-seal apparatuses.

What we claim is:

1. A self-activating-seal apparatus adapted for use with and to seal a magnetically permeable shaft element, which seal apparatus comprises:
    (a) an axially polarized, permanent-magnet ring element generally disposed to be aligned axially about the shaft element;
    (b) first and second magnetically permeable pole pieces, each at the one end disposed in a magnetic relationship with one pole of the permanent-magnet ring element, and each disposed at the other end to extend into a close, noncontacting relationship with the surface of the shaft element and to form a small gap with the surface of the shaft element, upon the insertion of the shaft element;
    (c) the first and second pole pieces and the ring element forming a generally annular cavity therebetween;
    (d) separate, nonmagnetic, penetrable, generally peripheral container means disposed within the cavity;
    (e) a sealing volume of ferrofluid disposed within the container means; and
    (f) penetrating means to permit the penetration of the container means prior to insertion of the shaft element, thereby permitting the ferrofluid to move from the container to a sealing position, on the change in the magnetic-flux path, by insertion of the shaft element.

2. The seal apparatus of claim 1 wherein the container means comprises a closed, ring-like, tubular container.

3. The seal apparatus of claim 1 wherein the container means comprises a tubular plastic container.

4. The seal apparatus of claim 3 wherein the container means comprises a pair of tubular plastic containers disposed in a generally side-by-side relationship within the cavity and occupying a substantial portion of the cavity.

5. The seal apparatus of claim 1 wherein the container means comprises a heat-shrunk and sealed plastic tubular container.

6. The seal apparatus of claim 5 wherein the tubular container has one end heat-shrunk about and in a sealing relationship with the other heat-shrunk sealed end of the tube, to form a ring-like tubular container of defined diameter to fit within the cavity.

7. The seal apparatus of claim 1 wherein the container means comprises a preformed, generally semirigid, ring-like, plastic, tubular container.

8. The seal apparatus of claim 1 wherein the ferrofluid comprises a diester ferrofluid.

9. The seal apparatus of claim 1 wherein the penetrating means comprises a removable means disposed in a close-fitting relationship on either side of the pole pieces, and having extended penetrating elements, whereby, on radially outward movement of the prong elements, penetration of the container means occurs.

10. The seal apparatus of claim 9 wherein the penetrating elements remain in place after penetration to seal the penetration of the container, and which includes removable means to retain the penetrating means in a penetrating and sealing position.

11. The seal apparatus of claim 1 wherein the penetrating means comprises a generally U-shaped, nonmagnetic clamp, the sides of the clamp disposed in a close-fitting holding relationship on the exterior sides of the pole pieces, and a plurality of sharp prong elements disposed within the clamp, whereby, on radially outward movement, the prong elements penetrate the container means.

12. The seal apparatus of claim 11 wherein the penetrating means includes at least four, generally aligned, prong elements within the clamp, and wherein the container means comprises two, closed-loop, plastic, tubular containers within the cavity, whereby one pair of prong elements is designed to penetrate each tubular container to form a vent and discharge holes therein.

13. The seal apparatus of claim 1 which includes a magnetically permeable shaft element positioned within the seal, with the container means penetrated and the ferrofluid in the sealing position in the gaps between the other ends of the pole pieces and the surface of the shaft element.

14. The seal apparatus of claim 13 wherein the shaft element comprises a rotatable computer-disc shaft element.

15. A self-activating-seal apparatus adapted for use with and to seal a magnetically permeable shaft element, which seal apparatus comprises:
(a) an axially polarized, permanent-magnet ring element generally disposed to be aligned axially about the shaft element;
(b) first and second magnetically permeable pole pieces, each at the one end disposed in a magnetic relationship with one pole of the permanent-magnet ring element, and each disposed at the other end to extend into a close, noncontacting relationship with the surface of the shaft element and to form a small gap with the surface of the shaft element, upon the insertion of the shaft element;
(c) the first and second pole pieces and the ring element forming a generally annular cavity therebetween;
(d) separate, nonmagnetic, penetrable, generally peripheral container means disposed within the cavity, the container means comprising a pair of tubular plastic containers disposed in a generally side-by-side relationship within the cavity and occupying a substantial portion of the cavity;
(e) a sealing volume of ferrofluid disposed within the container means; and
(f) penetrating means comprising a generally U-shaped, non-magnetic clamp, the sides of the clamp disposed in a close-fitting holding relationship on the exterior sides of the pole pieces, and a plurality of sharp prong elements disposed within the clamp, whereby, on radially outward movement, the prong elements penetrate the container means, the penetrating means permitting the penetration of the container means prior to insertion of the shaft element, thereby permitting the ferrofluid to move from the container to a sealing position, on the change in the magnetic-flux path, by insertion of the shaft element.

16. The seal apparatus of claim 15 wherein the penetrating means includes at least four, generally aligned, prong elements within the clamp, and wherein the container means comprises two, closed-loop, plastic, tubular containers within the cavity, whereby one pair of prong elements is designed to penetrate each tubular container to form a vent and discharge holes therein.

17. A container for ferrofluid adapted for use within a peripheral cavity in a ferrofluid-seal apparatus, which container comprises a closed loop of defined diameter of a heat-shrinkable, tubular, plastic material which contains a predetermined volume of a ferrofluid, one end of the tubular plastic material in a sealed, heat-shrunk condition, and the other end heat-shrunk about and in an overlapping sealing relationship with the other heat-shrunk, sealed end, to form a closed-loop ferrofluid container.

18. The container of claim 17 which includes a diester-based ferrofluid.

19. The container of claim 17 wherein the plastic material comprises a polyolefin polymer.

20. A method of sealing hermetically a magnetically permeable shaft element with a seal apparatus which comprises a permanent-magnet ring element disposed to surround the shaft element and first and second magnetically permeable pole pieces, which pole pieces at the one end are in a magnetic-flux relationship with the ring element and at the other end extend into a close, noncontacting relationship with the surface of the shaft element, the ring element and pole pieces forming a cavity therebetween, in which cavity the magnetic flux of the ring element is concentrated prior to insertion of the shaft element, the method which comprises:
(a) storing a sealing volume of ferrofluid in a separate, non-magnetic, generally peripheral container within the cavity; and
(b) penetrating the container within the cavity prior to the insertion of the shaft element, to permit the movement of the ferrofluid, on insertion of the shaft element, from within the penetrated container to a sealing position about the periphery of the shaft element.

21. The method of claim 20 which includes:
(a) penetrating the container with at least one penetrating element and leaving the penetrating element in position to seal the penetration so made in the container; and, thereafter,
(b) removing the penetrating element prior to insertion of the shaft element.

22. The method of claim 21 which includes retaining the penetrating element in a sealed position, while transporting the seal apparatus to a location for insertion of the shaft element.

23. The method of claim 20 which includes penetrating the container by a plurality of penetrating prong elements disposed to place a vent and a ferrofluid discharge hole in the container.

24. The method of claim 20 which includes penetrating the container by moving a penetrating prong element radially outwardly and into the cavity where the container is positioned.

25. The method of claim 20 which includes positioning within the cavity at least one closed-loop, sealed, plastic, tubular container of the ferrofluid.

26. The method of claim 25 which includes:
(a) positioning a pair of thin-wall, penetrable, closed-loop, sealed, plastic containers within the cavity; and
(b) penetrating and sealing, with at least two holes, each of the containers by a penetrating clamp;
(c) retaining the clamp in position to seal the holes during transporting of the seal; and
(d) removing the penetrating sealing clamp immediately prior to insertion of the shaft element.

27. The method of claim 20 which includes:
(a) forming a container by inserting a volume of ferrofluid within a defined length of a heat-shrinkable plastic tube;
(b) heat-shrinking and sealing one end of the plastic tube;
(c) inserting the other open end of the plastic tube over and in an overlapping relationship with the sealed one end of the plastic tube;
(d) heat-shrinking the other end of the plastic tube over and in a sealing relationship with one end of the plastic tube to form a closed, sealed, circular loop of the plastic tube; and
(e) inserting one or more of the looped plastic tubes within the cavity as the container for the ferrofluid.

28. The method of claim 20 which includes inserting the shaft element within the seal immediately after penetrating and unsealing of the container, to permit the movement of the ferrofluid from the penetrated container to a sealing position about the surface of the shaft element.

29. The method of claim 28 wherein the shaft element comprises a computer-disc-drive shaft element.

30. The method of claim 20 which includes:
(a) positioning the seal apparatus, on insertion of the shaft element, between a rotary driving means for the shaft element; and
(b) a computer-memory-disc element secured to the shaft element for rotation therewith, thereby providing a sealing relationship about the shaft element to protect the memory-disc from contaminants.

* * * * *